W. BEAL.
Corn Crusher.
No. 10,979.
Patented May 30, 1854.
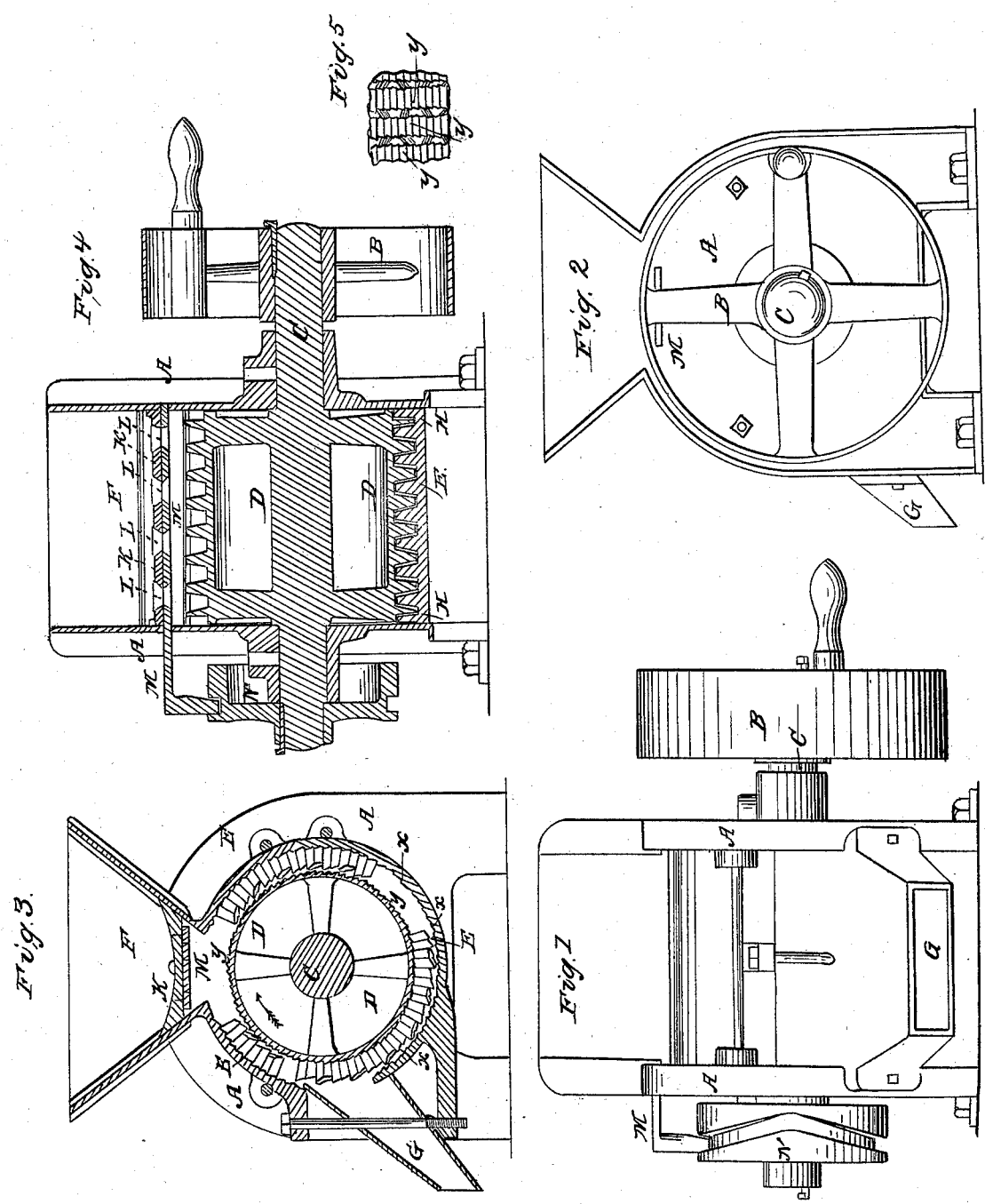

UNITED STATES PATENT OFFICE.

WILLIAM BEAL, OF LOWELL, MASSACHUSETTS.

CORN-CRUSHER.

Specification of Letters Patent No. 10,979, dated May 30, 1854.

*To all whom it may concern:*

Be it known that I, WILLIAM BEAL, of Lowell, in the county of Middlesex and State of Massachusetts, have invented new and useful Improvements in Machines for Crushing and Grinding Cobs, Corn, Bark, &c.; and I do hereby declare that the following is a full, clear, and exact description of the construction and operation of the same, reference being had to the accompanying drawings, making a part of this specification, in which—

Figure 1 is a side elevation; Fig. 2, an end elevation. Fig. 3, is a cross vertical section, showing a part of one notched rib in the cylinder, and parts of another in the concave, and Fig. 4, is a longitudinal vertical section.

Similar letters of reference, indicate corresponding parts in each of the several figures.

A, A, are cast iron frame ends, supporting the operating parts of the machine.

B, is the driving pulley on the end of the cylinder shaft C.

D, is a cast iron cylinder with a series of ribs on its surface; which ribs are notched on their surfaces in manner indicated by the drawings, to form the teeth which are to grind the substances put in contact with them.

Fig. 5, represents a plan of a part of the surface of the cylinder, with its ribs notched.

E, is a cast iron concave piece, which has toothed ribs similar to those in cylinder D. The surfaces, on both D, and E, which lie between the ribs, are also notched as represented at $x$ $x$, $y$, $y$, Figs. 3 and 5. It will be noticed that the toothed ribs of the cylinder D, fit between the toothed ribs of the concave E, and when the cylinder D, is put in motion in the direction of the arrow, the substance to be ground is caught by the teeth in D, as it falls from the hopper F, and is carried into contact with the teeth in the concave E, and being thoroughly crushed or ground, is thrown out of the machine at the outlet G.

At H, H, Fig. 4, are smooth ribs in the cylinder D, which fit into smooth grooves in the concave E. These serve in the first place to prevent the cylinder D from sliding or working endways when its shoulders get worn up, thereby allowing the teeth of the cylinder to come in contact with the teeth of the concave, which if the machine was in full operation, would be instant destruction to it, and in the second place, I can so construct my machine, as to have one smooth rib in the middle of the cylinder, which will serve to divide the machine into two distinct parts, where different substances can be ground at the same time without intermingling, putting in corresponding partitions in the hopper and outlet.

The notches which are made in the top of the ribs, are not cut in a line parallel to the direction of the axes of the two cylinders, but oblique to them, as shown in Fig. 5, and for this reason, viz: If the notches were cut square across the top of the ribs, parts of the substance to be ground might be caught in the notch or tooth, and be carried completely round without being crushed, whereas, in the case of the oblique tooth, the tendency is to constantly crowd the substance against the adjoining teeth; and as each succeeding tooth in a rib, is oblique in an opposite direction from the one before it, the effect is to crowd the particles, first in one direction, and then in the opposite, until they are thoroughly pulverized.

The hopper F, is provided with a cast iron bottom K, with oblong apertures L, L, L, L, Fig. 4, through which the substance to be ground, passes. Just beneath the bottom K, in close contact with it, is a cast iron slide M, supported at each end by the frame ends A, A. This slide has apertures in it corresponding with those in K, and the sides of the apertures in both, are beveled to an edge, so that when the machine is in operation, the slide M, moving rapidly back and forth, will cut the substance as it passes through the apertures and prepare it to be acted upon by the cylinder D, and at the same time regulates the feed, so that too much material shall not be engaged in the teeth of the cylinder at one time. The slide M, has a projection at one end that fits into a zig zag groove in the pulley N, which pulley is fastened to, and turns with, the cylinder shaft C. This pulley operates the slide back and forth, and as it is intended that the cylinders shall make five or six hundred revolutions per minute, the execution by the slide is great.

The advantages of these arrangements and improvements above all others are, 1st, their simplicity and cheapness; 2nd, the ribs (of which we may have one, two or more) serve to make separate and distinct apartments, so that, several substances, however different from each other, may be ground at the same time, without being mixed; 3rd, the same substance may be ground to different degrees of fineness, by having the teeth of one apartment finer than those of the other; 4th, the smooth ribs as before mentioned serve to keep the cylinder from working endways, and allowing its teeth to come in contact with those of the concave; 5th, the machine is easier and quicker constructed, as without the ribs, great care would be necessary to be taken in fitting the concave lest its teeth should interfere with those of the cylinder; 6th, the slide M, regulates the feed, so that too much material to be ground shall not fall from the hopper, and thus clog the cylinder; it also thoroughly cuts up the substance on its passage through, rendering it much easier for the cylinder to grind and pulverize it.

Having thus described my improvement, what I claim as new and desire to secure by Letters Patent, is:

The application and use of the peculiar form of tooth cut in the ribs both of the cylinder and concave, the front of the tooth being shaped obliquely across the ribs, and every succeeding tooth being oblique in an opposite direction to the preceding one for the purpose and object herein described.

WILLIAM BEAL.

Witnesses:
MERTOUN C. BRYANT,
STEPHEN CUSHING.